(12) United States Patent  
Okumura et al.

(10) Patent No.: US 9,511,767 B1  
(45) Date of Patent: Dec. 6, 2016

(54) AUTONOMOUS VEHICLE ACTION PLANNING USING BEHAVIOR PREDICTION

(71) Applicant: Toyota Motor Engineering & Manufacturing North America, Inc., Erlanger, KY (US)

(72) Inventors: Bunyo Okumura, Ann Arbor, MI (US); Michael R. James, Northville, MI (US); Katsuhiro Sakai, Ann Arbor, MI (US); Tomoki Nishi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/789,004

(22) Filed: Jul. 1, 2015

(51) Int. Cl.
| | |
|---|---|
| G08B 23/00 | (2006.01) |
| B60W 30/09 | (2012.01) |
| G05D 1/00 | (2006.01) |
| G08G 1/01 | (2006.01) |
| G01C 21/36 | (2006.01) |

(52) U.S. Cl.
CPC .......... *B60W 30/09* (2013.01); *G01C 21/3691* (2013.01); *G05D 1/0088* (2013.01); *G08G 1/0104* (2013.01); *G08G 1/0125* (2013.01); *G08G 1/0133* (2013.01); *B60W 2550/20* (2013.01)

(58) Field of Classification Search
CPC .. G08G 1/0133; G08G 1/0104; G08G 1/0125; G01C 21/3691
See application file for complete search history.

(56) References Cited

U.S. PATENT DOCUMENTS

| | | |
|---|---|---|
| 8,706,394 B2 | 4/2014 | Trepagnier et al. |
| 8,712,624 B1 | 4/2014 | Ferguson et al. |
| 8,948,955 B2 | 2/2015 | Zhu et al. |

(Continued)

FOREIGN PATENT DOCUMENTS

JP  2007125981 A  5/2007

OTHER PUBLICATIONS

Gustafsson; "Automaed Drive Environments and Decision Making"; Masters Thesis in Systems, Control and Mechatronics, Chalmers University of Technology, Sweden; 2013; (41 pages).

(Continued)

*Primary Examiner* — Tuan C. To  
(74) *Attorney, Agent, or Firm* — Christopher G. Darrow; Darrow Mustafa PC

(57) ABSTRACT

This application describes an automated driving system and methods. The automated driving system includes a perception system disposed on an autonomous vehicle. The automated driving system can detect, using the perception system, information for an environment proximate to the autonomous vehicle. The information for the environment includes current behavior of an object of interest and traffic density information. The automated driving system can also determine a classifier for the environment based on a prediction of future behavior of the object of interest. Based on the classifier, the automated driving system can identify a transition between vehicle states, the vehicle states being associated with a planned action for the autonomous vehicle. The automated driving system can also send a command to one or more vehicle systems to control the autonomous vehicle to execute the planned action according to the transition.

20 Claims, 4 Drawing Sheets

(56) References Cited

U.S. PATENT DOCUMENTS

| | | | | | |
|---|---|---|---|---|---|
| 2004/0252027 | A1* | 12/2004 | Torkkola | ............... | G08B 21/06 340/576 |
| 2008/0269985 | A1* | 10/2008 | Yamada | ............... | G08G 1/0104 701/36 |
| 2009/0048767 | A1* | 2/2009 | Vaughn | ............. | G01C 21/3415 701/117 |
| 2010/0082227 | A1* | 4/2010 | Posner | ............ | G08G 1/096775 701/118 |
| 2010/0104199 | A1* | 4/2010 | Zhang | ................. | G06N 3/0454 706/12 |
| 2013/0073192 | A1* | 3/2013 | Hota | ........................ | G08G 1/04 701/118 |
| 2013/0110386 | A1* | 5/2013 | Jin | ........................ | B60W 40/06 701/119 |
| 2013/0347062 | A1* | 12/2013 | Matityahu | ............... | H04L 43/12 726/1 |
| 2014/0114885 | A1* | 4/2014 | Han | ..................... | G06N 3/0454 706/12 |
| 2014/0288775 | A1* | 9/2014 | Prakah-Asante | ...... | G08G 1/166 701/37 |
| 2014/0358413 | A1* | 12/2014 | Trombley | ............... | G06G 1/00 701/118 |
| 2015/0106171 | A1* | 4/2015 | Zou | ........................ | G06Q 50/30 705/13 |
| 2015/0344040 | A1* | 12/2015 | Heckmann | ........... | B60W 50/08 701/1 |

OTHER PUBLICATIONS

Azimi et al.; "V2V-Intersection Management at Roundabouts"; SAE Int. J. Passeng. Cars—Mech. Syst.; 2013; (13 pages).

Perez et al.; "Autonomous driving manoeuvres in urban road traffic environment: a study on roundabouts"; Proceedings of the 18th World Congress, The International Federation of Automatic Control; Aug. 28-Sep. 2, 2011; (6 pages); Milano, Italy.

Muffert et al.; "May I Enter the Roundabout? A Time-To-Contact Computation Based on Stereo-Vision"; 2012 Intelligent Vehicles Symposium; Jun. 3-7, 2012; (6 pages); Alcala de Henares, Spain.

* cited by examiner

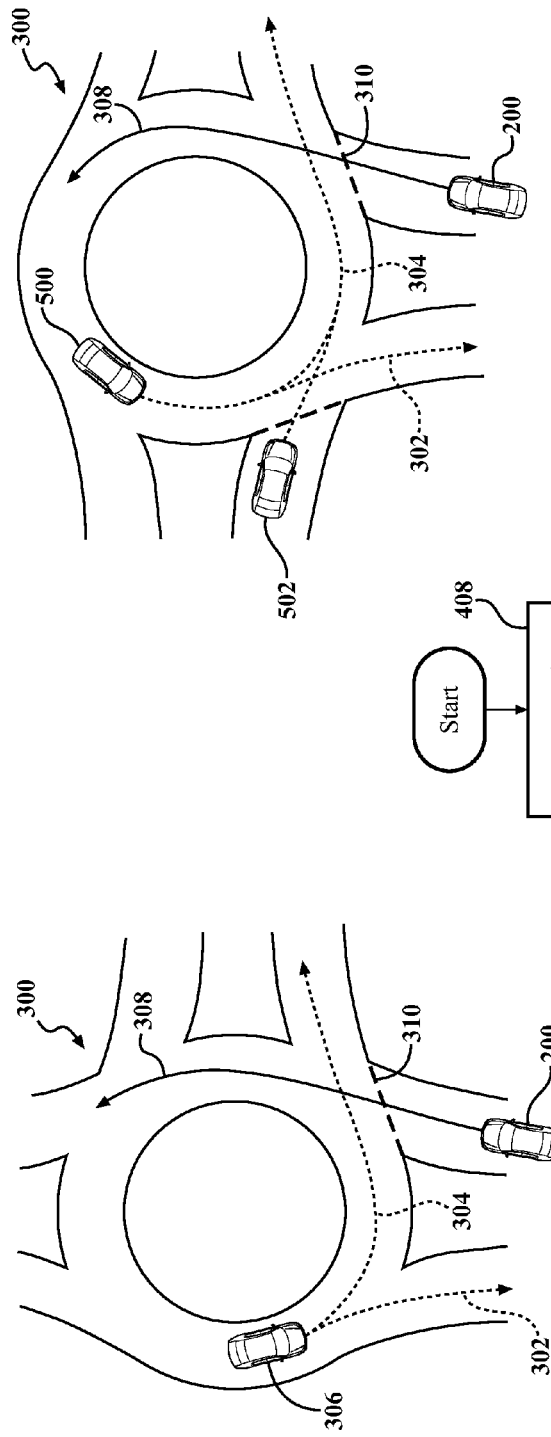
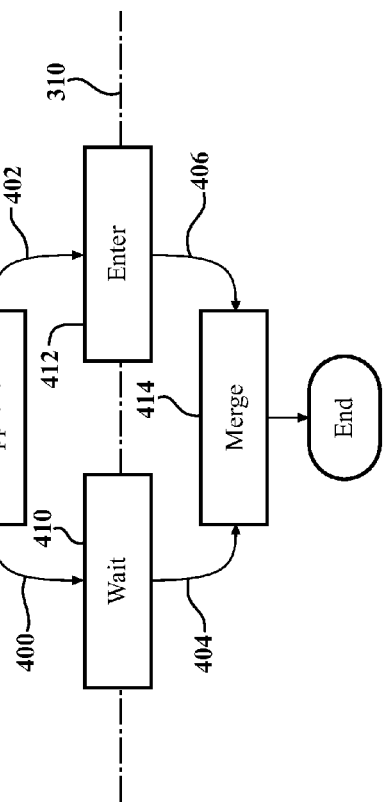
FIG. 3
FIG. 4
FIG. 5

AUTONOMOUS VEHICLE ACTION PLANNING USING BEHAVIOR PREDICTION

BACKGROUND

Fully or highly automated driving systems are designed to operate a vehicle on the road without driver interaction or other external control, for example, self-driving vehicles or autonomous vehicles. An autonomous vehicle is thus configured to traverse a planned path between its current position and a target future position without input from the driver. To traverse the planned path, the autonomous vehicle must account for behavior of objects within the environment, such as neighboring vehicles, pedestrians, or obstacles, and safely execute maneuvers taking the presence of such objects into account.

Prior art driving systems in autonomous vehicles account for current behavior of objects such as neighboring vehicles by relying on vehicle to vehicle communication, an impractical solution when many vehicles lack this technology, or by measuring a time to contact between vehicles to identify windows of opportunity for the autonomous vehicle to continue along its planned path. However, to improve safety and efficiency, a driving system in an autonomous vehicle will need to account for interactions between various objects within the environment and more accurately predict future behavior of these objects.

SUMMARY

An action-planning process implemented by an automated driving system captures current behavior for one or more objects of interest in the environment and determines a classifier for the environment based on the current behavior of the objects of interest and a prediction of the future behavior of those objects of interest. The future behavior prediction includes a comparison of current behavior to map information, traffic density information, and training data. The future behavior prediction can also include treating the object of interest as an autonomous vehicle capable of selecting future actions based on the environment. Based on the classifier selected, the automated driving system can implement a planned action, such as entering a roundabout or changing lanes, by executing a series of transitions between vehicle states where each of the vehicle states are associated with the planned action.

In one implementation, an automated driving system is disclosed. The automated driving system includes a perception system disposed on an autonomous vehicle and a computing device in communication with the perception system. The computing device includes one or more processors for controlling operations of the computing device and a memory for storing data and program instructions used by the one or more processors. The one or more processors are configured to execute instructions stored in the memory to: detect, using the perception system, information for an environment proximate to the autonomous vehicle, the information including current behavior of an object of interest and traffic density information; determine a classifier for the environment based on a prediction of future behavior of the object of interest; based on the classifier, identify a transition between vehicle states, the vehicle states associated with a planned action for the autonomous vehicle; and send a command to one or more vehicle systems to control the autonomous vehicle to execute the planned action according to the transition.

In another implementation, a computer-implemented method of automated driving is disclosed. The method includes detecting, using a perception system disposed on an autonomous vehicle, information for an environment proximate to the autonomous vehicle, the information including current behavior of an object of interest and traffic density information; determining a classifier for the environment based on a prediction of future behavior of the object of interest; based on the classifier, identifying a transition between vehicle states, the vehicle states associated with a planned action for the autonomous vehicle; and sending a command to one or more vehicle systems to control the autonomous vehicle to execute the planned action according to the transition.

In another implementation, a computing device is disclosed. The computing device includes one or more processors for controlling operations of the computing device and a memory for storing data and program instructions used by the one or more processors. The one or more processors are configured to execute instructions stored in the memory to: detect, using a perception system disposed on an autonomous vehicle, information for an environment proximate to the autonomous vehicle, the information including current behavior of an object of interest and traffic density information; determine a classifier for the environment based on the current behavior of the object of interest and a prediction of future behavior of the object of interest; based on the classifier, identify a transition between vehicle states, the vehicle states associated with a planned action for the autonomous vehicle; and send a command to one or more vehicle systems to control the autonomous vehicle to execute the planned action according to the transition.

BRIEF DESCRIPTION OF THE DRAWINGS

The description herein makes reference to the accompanying drawings wherein like reference numerals refer to like parts throughout the several views, and wherein:

FIG. 3 shows a roundabout including a plurality of potential paths for a neighboring vehicle proximate to the autonomous vehicle of FIG. 2;

FIG. 4 shows a logic flowchart of transitions between vehicle states for the autonomous vehicle of FIG. 2 as associated with entering the roundabout of FIG. 3;

FIG. 5 shows the roundabout of FIG. 3 including a plurality of neighboring vehicles proximate to the autonomous vehicle of FIG. 2;

DETAILED DESCRIPTION

A high-level action planner for an automated driving system determines how an autonomous vehicle will transition between various vehicle states associated with a planned action. The transitions are selected based on a learned classifier chosen for the environment perceived proximate to the autonomous vehicle. The learned classifier can be selected based on training data, a comparison of current behavior of objects of interest, such as neighboring vehicles, to map information or traffic density information to make predictions about future behavior of the objects of interest, and any predicted interactions between objects of interest and the autonomous vehicle. Once the planned action, vehicle states, and transitions to follow are selected based on the classifier, the automated driving system can send low-level commands to various vehicle systems to execute the planned action according to the transitions.

Figure 1:
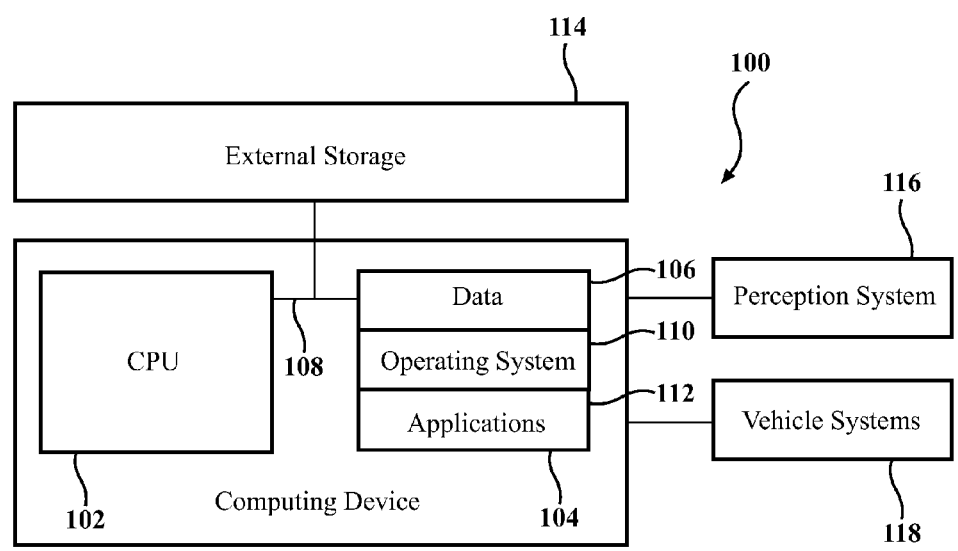
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can be configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle. Information specific to the environment surrounding a vehicle can include information specific to objects such as neighboring vehicles, pedestrians, and obstacles proximate to a planned vehicle path of the autonomous vehicle or any other localized position data and/or signals that can be captured and sent to the CPU 102.

In the examples described below, the perception system 116 can be configured to capture, at least, images for an image-based sensor system such that the computing device 100 can detect the presence of, position of, and orientation of neighboring vehicles, pedestrians, or other obstacles within the images. The computing device 100 can also be in communication with one or more vehicle systems 118, such as a vehicle braking system, a vehicle propulsion system, a vehicle steering system, etc. The vehicle systems 118 can also be in communication with the perception system 116, the perception system 116 being configured to capture data indicative of performance of the various vehicle systems 118.

Figure 2:
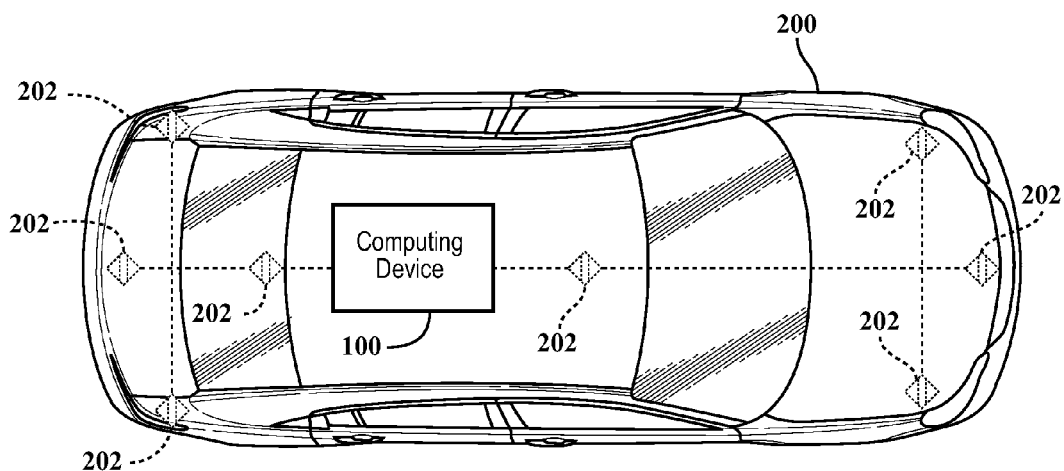
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, at least some of the sensors 202 being part of the perception system 116 described in reference to FIG. 1. One or more of the sensors 202 shown can be configured to capture images for processing by an image sensor, vehicle position in global coordinates based on signals from a plurality of satellites, the distance to objects within the surrounding environment for use by the computing device 100 to estimate position and orientation of the autonomous vehicle 200 and the objects such as neighboring vehicles, pedestrians, or obstacles within the surrounding environment, or any other data and/or signals that could be used to determine the current state of the autonomous vehicle 200 or determine the current state of the surrounding environment including the presence of, position of, and orientation of neighboring vehicles, pedestrians, or obstacles.

FIG. 3 shows a roundabout 300 including a plurality of potential paths 302, 304 for a neighboring vehicle 306 proximate to the autonomous vehicle 200 of FIG. 2. A planned path 308 for the autonomous vehicle 200 is also shown as intersecting one of the potential paths 304 of the neighboring vehicle 306. Given traffic rules traditionally associated with a roundabout 300, a decision point in the form of a yield line 310 is shown at the entrance of the roundabout 300 ahead of the current position of the autonomous vehicle 200. In this example, the yield line 310 is at a location where a manual driver would either enter the roundabout 300 or wait at the entrance of the roundabout 300 to allow traffic to clear. Though this scenario is straightforward for the manual driver, replicating the behavior of the manual driver using an automated driving system requires a thorough understanding of the environment proximate to the autonomous vehicle 200 including an understanding of the future behavior of the neighboring vehicle 306.

For example, the autonomous vehicle 200 can first recognize that the roundabout 300, a type of intersection, is present along the planned vehicle path 308 for the autonomous vehicle 200. Information related to the roundabout 300, such as the position of exits and entrances, the curvature of the lanes, etc., can be recognized using image-based sensors 202 as part of the perception system 116 or using map-based information present within the memory 104 of the computing device or accessible to the computing device 100 at a remote location. Once the autonomous vehicle 200 is sufficiently proximate to the roundabout 300, the neighboring vehicle 306 can be recognized using, for example, image-based or LIDAR sensors 202 disposed on the autonomous vehicle 200.

FIG. 3 shows that the neighboring vehicle 306 is currently within the roundabout 300 at a position where one potential path 302 indicates that the neighboring vehicle 306 could leave the roundabout 300 before intersecting with the planned path 308 of the autonomous vehicle 200. Alternatively, the potential path 304 indicates that the neighboring vehicle 306 could stay in the roundabout 300 and drive in front of the autonomous vehicle 200. If the neighboring vehicle 306 were to proceed along the potential path 302, the autonomous vehicle 200 would be free to enter the roundabout 300 ahead of the neighboring vehicle 306. However, if the neighboring vehicle 306 were to proceed along the potential path 304, the autonomous vehicle 200 would need to wait for the neighboring vehicle 306 to pass before entering the roundabout 300.

To aid in predicting the future behavior of the neighboring vehicle 306, the autonomous vehicle 200 can use the perception system 116 to collect information about the neighboring vehicle 306 such as its size within an image (to determine distance) and its current behaviors such as its position and orientation in respect to the road or the autonomous vehicle 200, or its velocity, acceleration, yaw rate, or any other current behavior. In the example of FIG. 3, the neighboring vehicle 306 is in a position and orientation in respect to the lane structure of the roundabout 300 such that either of the potential paths 302, 304 are equally possible. The neighboring vehicle 306 is also physically close to the autonomous vehicle 200, close enough that if the neighboring vehicle 306 is traveling at a sufficient velocity, the autonomous vehicle 200 would not be able to pull safely in front of the neighboring vehicle 306 should the neighboring vehicle 306 proceed along potential path 304.

Given that the current behavior perceived for the neighboring vehicle 306 does not allow the automated driving system to directly determine which of the potential paths 302, 304 will be chosen by the neighboring vehicle 306, the automated driving system can be configured to use additional information, such as map information, traffic density information, and previously captured training data in order to determine a classifier for the environment based on a prediction of future behavior for the neighboring vehicle 306. Based on the classifier chosen, the automated driving system can direct its own behavior along the planned path 308. The process of selecting the classifier and implementing a planned action based on the classifier, in this case, entering the roundabout 300, is described in terms of transitions between vehicle states in association with FIG. 4.

FIG. 4 shows a logic flowchart of transitions 400, 402, 404, 406 between vehicle states 408, 410, 412, 414 for the autonomous vehicle 200 of FIG. 2 as associated with the planned action of entering the roundabout 300 of FIG. 3. In determining when to execute the various transitions 400, 402, 404, 406, the automated driving system is configured to represent the environment proximate to the autonomous vehicle 200 as a function F that maps various features X to high-level actions a, that is, a=F(X). The mapping function F can be decomposed into a combination of dependent and independent terms where x corresponds to each object in X.

$$a = F(X) \cong C(f(x_1), f(x_2), \ldots, g(x_i, x_j), \ldots) \quad [1]$$

In equation [1], the function C is combination of the function $f$ that maps features of each independent object and the function g that takes into account any interactions between the independent objects in the environment surrounding the autonomous vehicle 200. The decomposition function C allows the function $f$ to be learned from a small amount of training data. Both of the functions $f$ and g can include a term p that represents a prediction of future behavior for objects within the environment, these objects being potential objects of interest such as neighboring vehicles, pedestrians, and obstacles. Whether an object within the environment becomes an object of interest depends on the impact of that object's current and future behavior on the actions of the autonomous vehicle 200. The prediction of future behavior for an object of interest is integrated into equation [1] as shown below by equation [2].

$$a = F(X) \cong C(f(x_1, p_1), f(x_2, p_2), \ldots, g(x_i, x_j, p_i, p_j), \ldots) \quad [2]$$

In equation [2], the term p, representative of a prediction, can be computed based on current behavior information for objects of interest, such as neighboring vehicles, pedestrians, or obstacles, captured by the perception system 116. This current behavior information can be compared to map information for the intersection being traversed by the autonomous vehicle 200 or to traffic density information for the intersection using the prediction function h where $p_i = h(x_i)$ in order to determine a planned action for an object of interest based on the map information and/or the traffic density information. The term p can include, for example, the high-level action associated with the planned action, a probability for the planned action, or a binary action comparing the probability of the planned action to a predetermined threshold. This threshold can be set such that a planned action is proscribed to the object of interest for use in determining the behavior of the autonomous vehicle 200 only if the probability of the planned action is greater than, for example, 80% or 90%.

Traffic density information, also used in predicting future behavior of objects of interest, can indicate a general congestion level for an intersection without identifying individual vehicles present at the intersection. Map information and traffic density information is also useful because it can be accessed by the automated driving system from a remote location, for example, from a remote map database, before the autonomous vehicle 200 reaches a point, such as yield line 310 in FIG. 3, where a decision regarding a planned action, in this case, a choice of transition, needs to be made by the autonomous vehicle 200.

The term p in equation [2] is also determined by treating the relevant object, for example, the neighboring vehicle 306 of FIG. 3, as if the neighboring vehicle 306 were an autonomous vehicle capable of making its own informed decisions regarding upcoming actions based on access to training data, map information, traffic density information, behavior information for other objects of interest, and the current behavior of the autonomous vehicle 200. That is, the prediction can be represented by $p_i = F(X_i)$ where the mapping calculation is applied from the point of view of the neighboring vehicle 306.

Applying the above-described predictions to implementing the planned action for the autonomous vehicle 200, that is, entering the roundabout 300, includes representing the planned action as including an approach state 408, a wait state 410, an enter state 412, and a merge state 414. The various vehicle states 408, 410, 412, 414 associated with the planned action of entering the roundabout 300 can be related to the physical environment of the roundabout 300 by mapping the yield line 310 on the flowchart. When the autonomous vehicle 200 is in the position shown in FIG. 3, it can identify the roundabout 300 using, for example, map information or information captured by the perception system 116. Once the roundabout 300 is identified, the autonomous vehicle 200 can start the planned action of entering the roundabout 300 by entering the approach state 408.

Next, the automated driving system will identify a classifier for the environment based on a prediction of future behavior of an object of interest within the environment. In the example of FIG. 4, the classifier can be identified by comparing the current behavior of the neighboring vehicle 306 of FIG. 3 to map information, traffic density information, and the behavior of the autonomous vehicle 200 using the decomposition function C.

For example, vehicles with potential interactions, that is, interacting vehicles, can be identified based on map information, traffic density information, and/or predictions for individual vehicles. Once interacting vehicles are identified, the classifier function g is applied for these interacting vehicles, and a high-level action for interacting vehicles is computed. Independent predictions are also determined for additional vehicles, pedestrians, obstacles, etc. present in the environment that do not indicate any interactions, and the classifier function f is applied for these independent vehicles, pedestrians, or obstacles.

The classifier functions f and g can be implemented by a table for input feature x using a mapping function trained from training data. Input feature x can be based on map information, traffic density information, and/or various properties associated with the interacting vehicles and additional vehicles. Once all classifiers are computed, the combination function C computes a high-level action for the autonomous vehicle based on the current environment. For example, the high-level action allows entering the roundabout 300 only when all classifiers computed allow entering the roundabout 300.

In the specific example shown in FIG. 4, once the classifier is identified, one of the transitions 400, 402 can be identified between the approach state 408 and either the wait state 410 or the enter state 412 based on the classifier. When the autonomous vehicle 200 reaches the yield line 310, the decision will have been made whether the autonomous vehicle waits for the neighboring vehicle 306 to pass, that is, follows the transition 400 to the wait state 410, or enters the roundabout 300 in front of the neighboring vehicle 306, that is, follows the transition 402 to the enter state 310.

The automated driving system is also configured to send a command to one or more of the vehicle systems 118 to execute the planned action according to the identified transition based on the classifier. Implementation of the planned action of entering the roundabout 300 according to the classifier continues by either identifying the transition 404 between the wait state 410 and the merge state 414 or by identifying the transition 406 between the enter state 412 and the merge state 414. In other words, merging into the roundabout 300 eventually occurs whether the autonomous vehicle was controlled to wait at the position of the yield line 310 by choosing the transition 400 between the approach state 408 and the wait state 410 or was controlled to smoothly enter the roundabout 300 without waiting at the yield line 310 by choosing the transition 402 between the approach state 408 and the enter state 412.

FIG. 5 shows the roundabout 300 of FIG. 3 including a plurality of neighboring vehicles 500, 502 proximate to the autonomous vehicle 200 of FIG. 2. Though similar to the situation in FIG. 3, the environment surrounding the autonomous vehicle 200 in FIG. 5 is somewhat more complicated, with predicted interactions between objects of interest, such as the neighboring vehicle 500 and the neighboring vehicle 502, having a greater influence on the automated driving system's selection of a classifier.

In this example, the perception system 116 can detect the neighboring vehicle 502 in a position generally consistent with a selection of the wait state 410 for the autonomous vehicle 200 once reaching the yield line 310. However, the classifier is also configured to account for the interaction between the neighboring vehicles 500, 502. For example, applying the mapping calculation $F(X_i)$ from the point of view of the neighboring vehicle 502 can lead to a probability determination that the neighboring vehicle 502 will wait for the neighboring vehicle 500 to follow either of the potential paths 302, 304 before entering the roundabout 300.

If the probability of the neighboring vehicle 502 waiting for the neighboring vehicle 500 surpasses a predetermined threshold, the autonomous vehicle 200 can be controlled to execute its own entry into the roundabout 300 without taking the path including the wait state 410. That is, since the neighboring vehicle 502 will be waiting for the neighboring vehicle 500 to move through the roundabout 300, the autonomous vehicle 200 can immediately move along the transition 402 between the approach state 408 and the enter state 412 and the transition 406 between the enter state 412 and the merge state 414 to execute its entry into the roundabout 300.

Figure 6:
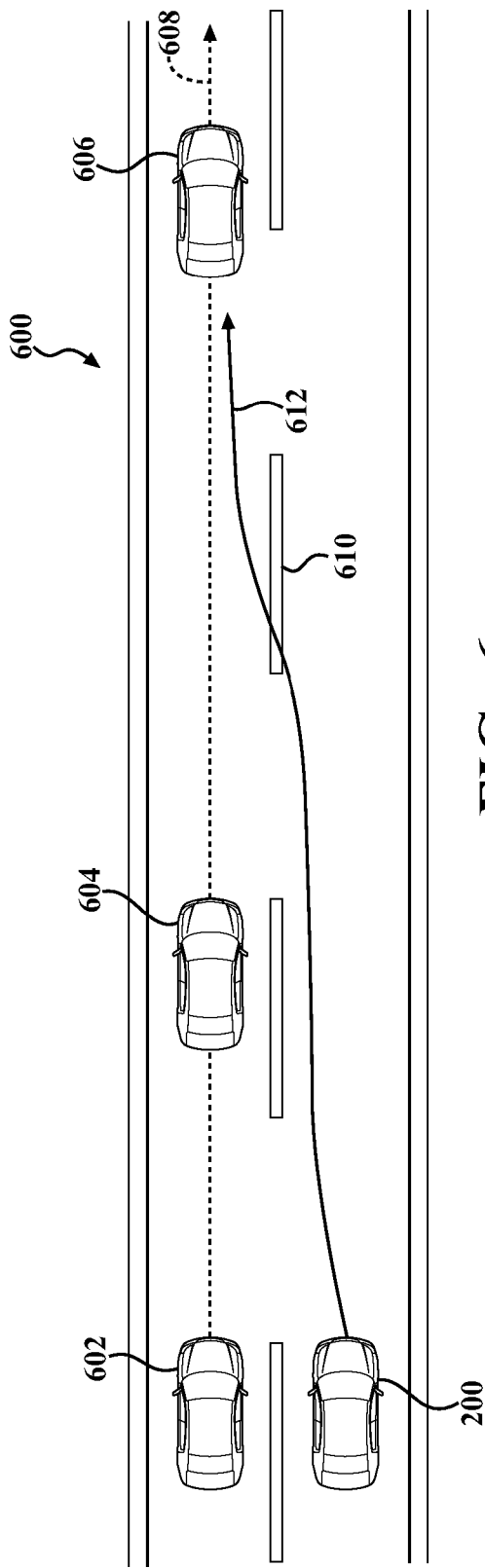
FIG. 6 shows a two-lane road including a plurality of neighboring vehicles proximate to the autonomous vehicle of FIG. 2.

FIG. 6 shows a two-lane road 600 including a plurality of neighboring vehicles 602, 604, 606 proximate to the autonomous vehicle 200 of FIG. 2. Each of the neighboring vehicles 602, 604, 606 is currently following the same potential path 608 that travels the center of the left lane of the two-lane road 600. The autonomous vehicle 200 is currently positioned in the right lane of the two-lane road 600, with the left lane and the right lane separated by a dividing line 610. A planned path 612 for the autonomous vehicle 200 is also shown as crossing over the dividing line 610 to approach the potential path 608 of the neighboring vehicles 602, 604, 606. Thus, the planned path 612 for the autonomous vehicle 200 is representative of a planned action of changing lanes.

Given traffic rules traditionally associated with the two-lane road 600, the dividing line 610 between the right lane and the left lane serves a decision point for the autonomous vehicle 200. In this example, the dividing line 610 is at a location where a manual driver would either enter the stream of the neighboring vehicles 602, 604, 606 by merging or wait near the diving line 610 to allow traffic to clear before changing lanes. Again, though this scenario is straightforward for the manual driver, replicating the behavior of the manual driver using an automated driving system requires a thorough understanding of the environment proximate to the autonomous vehicle 200 including an understanding of the future behavior of the neighboring vehicles 602, 604, 606 and any interactions between the neighboring vehicles 602, 604, 606.

To aid in predicting the future behavior of the neighboring vehicles 602, 604, 606, the autonomous vehicle 200 can use the perception system 116 to collect information about each of the neighboring vehicles 602, 604, 606 independently. In the example of FIG. 6, all of the neighboring vehicles 602, 604, 606 are positioned in the center of the left lane of the two-lane road 600 and are not turning or drifting toward the dividing line 610. Given these positions and orientations, it is unlikely that any of the neighboring vehicles 602, 604, 606 are planning to change lanes between the left lane and the right lane. The perception system 116 can also be used to determine the speed or acceleration for each of the neighboring vehicles 602, 604, 606 in order to determine whether the spacing between each of the neighboring vehicles is increasing or decreasing. The interactions between the neighboring vehicles 602, 604, 606 can also impact how the automated driving system will implement the planned action of changing lanes.

For example, the neighboring vehicle 602 is close behind the neighboring vehicle 604 along the potential path 608. Any changes in speed or acceleration by the neighboring vehicle 604 will directly impact the future behavior of the neighboring vehicle 602. Given this relationship, the autonomous vehicle 200 is not likely able to change lanes along the planned path 612 between the neighboring vehicles 602, 604. The same close relationship is not true for the neighboring vehicles 604, 606 since a larger gap is present between the neighboring vehicle 604 and the neighboring vehicle 606. Thus, any changes in speed or acceleration by the neighboring vehicle 606 will take a bit longer to impact the future behavior of the neighboring vehicles 602, 604.

Again, the automated driving system can determine a classifier for the environment based on the current behavior of the neighboring vehicle 602, 604, 606, a prediction of future behavior for the neighboring vehicles 602, 604, 606, and the potential interactions between the neighboring vehicles 602, 604, 606. Based on the classifier chosen, the automated driving system can direct its own behavior along the planned path 612. The process of selecting the classifier and implementing a planned action based on the classifier, in this case, changing lanes on the two-lane road 600, is described in terms of transitions between vehicle states in association with FIG. 7.

Figure 7:
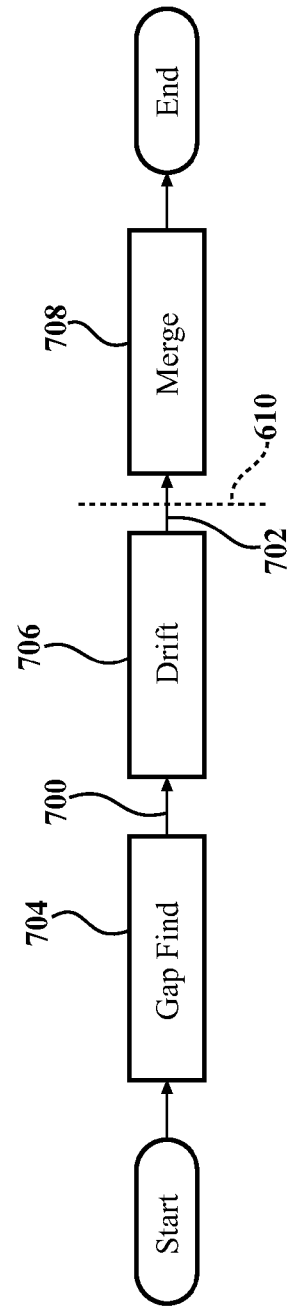
FIG. 7 is a logic flowchart of transitions between vehicle states for the autonomous vehicle of FIG. 2 as associated with changing lanes on the two-lane road of FIG. 6.

FIG. 7 is a logic flowchart of transitions 700, 702 between vehicle states 704, 706, 708 for the autonomous vehicle 200 of FIG. 2 as associated with changing lanes on the two-lane road 600 of FIG. 6. As described above in reference to FIG. 4, equation [2] governs selection of a classifier where the function $f$ maps features of each independent object, in this case, the neighboring vehicles 602, 604, 606, and the function $g$ accounts for any interactions between the objects in the environment surrounding the autonomous vehicle 200. Again, selection of the classifier can be based on training data from similar situations, map information, traffic density information, current behavior of any objects of interest, predicted behavior for objects of interest, and potential interactions between the objects of interest.

Selection of the classifier allows the automated driving system to implement the high-level planned action of changing lanes by identifying the timing and sequence of the transitions 700, 702 between the applicable vehicle states 704, 706, 708. For example, starting the high-level action of lane changing in a gap find state 704, the automated driving system identifies potential areas where lane changing is possible. Based on the small gap between the neighboring vehicles 602, 604 and the highly likely dependent behavior between the neighboring vehicles 602, 604, this gap is likely to be ignored by the automated driving system.

After a more suitable gap is identified, for example, the gap between the neighboring vehicle 604 and the neighboring vehicle 606, the automated driving system follows the transition 700 to move the autonomous vehicle 200 to a drift state 706 where the autonomous vehicle 200 approaches the dividing line 610 in order to signal to the neighboring vehicles 602, 604, 606 that a change of lanes is imminent. After a sufficient time in the drift state 706, the autonomous vehicle 200 is controlled to cross the dividing line 610, also indicated in FIG. 7 along the transition 702, and enter a merge state 708 where the autonomous vehicle 200 takes its place on the planned path 612 between the neighboring vehicle 604 and the neighboring vehicle 606, each on the potential path 608. At this point, the planned action of changing lanes is complete, and the planned path 612 merges with the potential path 608 of the neighboring vehicles 602, 604, 606.

Figure 8:
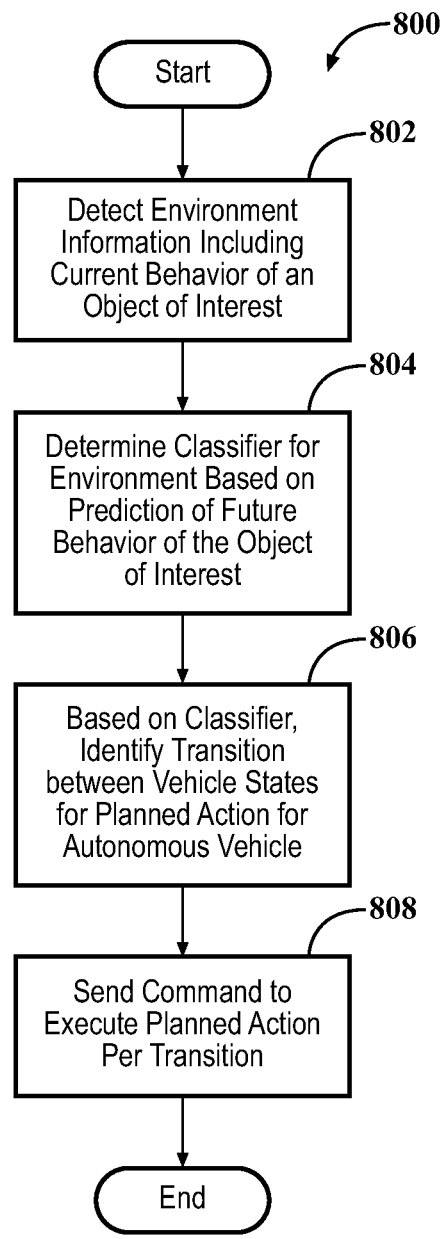
FIG. 8 is a logic flowchart of a vehicle action-planning process performed by the automated driving system.

FIG. 8 is a logic flowchart of a vehicle action planning process 800 performed by the automated driving system. In step 802 of the process 800, the automated driving system can detect information for an environment proximate to the autonomous vehicle 200, the information including current behavior for at least one object of interest. The object of interest can be a neighboring vehicle, such as the neighboring vehicle 306 in FIG. 3, or several objects of interest, such as the neighboring vehicles 500, 502 in FIG. 5 or the neighboring vehicles 602, 604, 606 in FIG. 6. The current behavior can include position, orientation, velocity, acceleration, yaw rate, or any other measurable value associated with the object of interest. The information for the environment can also include traffic density information, for example, the general congestion level for a road or an intersection that indicates how busy the location is without specifically identifying individual vehicles, pedestrians, or obstacles.

In step 804 of the process 800, the automated driving system can determine a classifier for the environment based on a prediction of future behavior of the object of interest. This prediction of future behavior can include comparing the current behavior of the object of interest to map information. For example, the position and orientation of the neighboring vehicle 306 in FIG. 3 can be compared to lane information for the roundabout 300 to predict whether the neighboring vehicle 306 is more likely to pursue the potential path 302 or the potential path 304. The prediction of future behavior can also include comparing the current behavior of the object of interest to traffic density information. For example, the neighboring vehicle 502 in FIG. 5 is located proximate to a somewhat congested roundabout 300, making it probable that the neighboring vehicle 502 will wait for traffic congestion to clear before proceeding into the roundabout 300.

In general, determining the classifier for the environment based on the comparison between the current behavior of an object of interest and map information or traffic density information includes determining a planned action for the object of interest based on the map information or traffic density information, determining a probability for the planned action, and comparing that probability to predetermined threshold. Determining the classifier can also include comparing the current behavior of the object of interest to training data, that is, to previously learned situations that are comparable to the current environment captured by the perception system 116. Determining the classifier can also include comparing the current behavior of the object of interest to current behavior of the autonomous vehicle 200. For example, the automated driving system can determine the difference in speed, position, acceleration, etc. between the object of interest and the autonomous vehicle 200 when selecting a classifier for the environment.

In step 806 of the process 800, the automated driving system can identify a transition between vehicle states associated with a planned action for the autonomous vehicle 200 based on the classifier. Exemplary planned actions include entering a roundabout (FIGS. 3-5) and changing lanes (FIGS. 6-7). In the case of entering a roundabout 300 as described in respect to FIG. 4, the vehicle states include the approach state 408, the wait state 410, the enter state 412, and the merge state 414. Whether the autonomous vehicle 200 is controlled to take the transition 400 between the approach state 408 and the wait state 410 or the transition 402 between the approach state 408 and the enter state 412 depends on the predicted behavior of the object(s) of interest within the environment of the roundabout 300.

For example, in the environment of FIG. 3, the autonomous vehicle 200 can be directed to take the transition 400 to the wait state 410 since the neighboring vehicle 306 is equally likely to take the potential path 302 as the potential path 304. In the environment of FIG. 5, the autonomous vehicle 200 can be directed to take the transition 402 to the enter state 412 since the neighboring vehicle 502 is likely to wait for the neighboring vehicle 500 before entering the roundabout 300. In either case, the classifier dictates how the autonomous vehicle 200 will choose transitions between vehicle states.

In step 808 of the process 800, the automated driving system can send a command to one or more vehicle systems 118 to execute the planned action according to the transition(s). In the example of FIG. 3, where the autonomous vehicle 200 is controlled to select the transition 400 between the approach state 408 and the wait state 410, the automated driving system can send a command to the vehicle braking system to slow the autonomous vehicle 200 between its current position as shown in FIG. 3 to a stopped position at the yield line 310. Similarly, in the example of FIG. 5, where the autonomous vehicle 200 is controlled to select the transition 402 between the approach state 408 and the enter state 412, the automated driving system can send a command to the vehicle propulsion system to move the autonomous vehicle 200 between its current position as shown in FIG. 5 smoothly past the yield line 310 at a controlled speed. After step 808, the process 800 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
   a perception system disposed on an autonomous vehicle; and
   a computing device in communication with the perception system, comprising:
      one or more processors for controlling operations of the computing device; and
      a memory for storing data and program instructions used by the one or more processors, wherein the one or more processors are configured to execute instructions stored in the memory to:
         detect, using the perception system, information for an environment proximate to the autonomous vehicle, the information including current behavior of an object of interest and traffic density information;
         determine a classifier for the environment based on a prediction of future behavior of the object of interest;
         based on the classifier, identify a transition between vehicle states, the vehicle states associated with a planned action for the autonomous vehicle; and
         send a command to one or more vehicle systems to control the autonomous vehicle to execute the planned action according to the transition.

2. The system of claim 1, wherein the object of interest is one of a neighboring vehicle, a pedestrian, and an obstacle.

3. The system of claim 1, wherein the current behavior of the object of interest includes at least one of position and orientation and velocity and acceleration.

4. The system of claim 1, wherein determining the classifier based on the prediction of the future behavior of the object of interest includes comparing the current behavior of the object of interest to at least one of map information and the traffic density information.

5. The system of claim 4, wherein comparing the current behavior of the object of interest to at least one of the map information and the traffic density information includes determining a planned action for the object of interest based on at least one of the map information and the traffic density information, determining a probability for the planned action, and comparing the probability to a predetermined threshold.

6. The system of claim 1, wherein determining the classifier is further based on comparing the current behavior of the object of interest to at least one of training data and current behavior of the autonomous vehicle.

7. The system of claim 1, wherein the planned action for the autonomous vehicle is entering a roundabout and the vehicle states include approach, enter, wait, and merge.

8. The system of claim 1, wherein the planned action for the autonomous vehicle is changing lanes and the vehicle states include gap find, drift, and merge.

9. A computer-implemented method of automated driving, comprising:
   detecting, using a perception system disposed on an autonomous vehicle, information for an environment proximate to the autonomous vehicle, the information including current behavior of an object of interest and traffic density information;
   determining a classifier for the environment based on a prediction of future behavior of the object of interest;
   based on the classifier, identifying a transition between vehicle states, the vehicle states associated with a planned action for the autonomous vehicle; and
   sending a command to one or more vehicle systems to control the autonomous vehicle to execute the planned action according to the transition.

10. The method of claim 9, wherein the object of interest is one of a neighboring vehicle, a pedestrian, and an obstacle.

11. The method of claim 9, wherein the current behavior of the object of interest includes at least one of position and orientation and velocity and acceleration.

12. The method of claim 9, wherein determining the classifier based on the prediction of the future behavior of the object of interest includes comparing the current behavior of the object of interest to at least one of map information and the traffic density information.

13. The method of claim 12, wherein comparing the current behavior of the object of interest to at least one of the map information and the traffic density information includes determining a planned action for the object of interest based on at least one of the map information and the traffic density information, determining a probability for the planned action, and comparing the probability to a predetermined threshold.

14. The method of claim 9, wherein determining the classifier is further based on comparing the current behavior of the object of interest to at least one of training data and current behavior of the autonomous vehicle.

15. A computing device, comprising:
   one or more processors for controlling operations of the computing device; and
   a memory for storing data and program instructions used by the one or more processors, wherein the one or more processors are configured to execute instructions stored in the memory to:
      detect, using a perception system disposed on an autonomous vehicle, information for an environment proximate to the autonomous vehicle, the information including current behavior of an object of interest and traffic density information;
      determine a classifier for the environment based on the current behavior of the object of interest and a prediction of future behavior of the object of interest;

based on the classifier, identify a transition between vehicle states, the vehicle states associated with a planned action for the autonomous vehicle; and send a command to one or more vehicle systems to control the autonomous vehicle to execute the planned action according to the transition.

16. The computing device of claim 15, wherein the object of interest is one of a neighboring vehicle, a pedestrian, and an obstacle and wherein the current behavior of the object of interest includes at least one of position and orientation and velocity and acceleration.

17. The computing device of claim 15, wherein determining the classifier based on the prediction of the future behavior of the object of interest includes comparing the current behavior of the object of interest to at least one of map information and the traffic density information.

18. The computing device of claim 15, wherein comparing the current behavior of the object of interest to at least one of the map information and the traffic density information includes determining a planned action for the object of interest based on at least one of the map information and the traffic density information, determining a probability for the planned action, and comparing the probability to a predetermined threshold.

19. The computing device of claim 15, wherein determining the classifier based on the current behavior of the object of interest includes comparing the current behavior of the object of interest to at least one of training data and current behavior of the autonomous vehicle.

20. The computing device of claim 15, wherein the planned action for the autonomous vehicle is entering a roundabout and the vehicle states include approach, enter, wait, and merge.

* * * * *